US009432859B2

United States Patent
Devarasetty et al.

(10) Patent No.: US 9,432,859 B2
(45) Date of Patent: *Aug. 30, 2016

(54) METHODS, SYSTEMS, AND COMPUTER READABLE MEDIA FOR TESTING LONG TERM EVOLUTION (LTE) AIR INTERFACE DEVICE USING PER-USER EQUIPMENT (PER-UE) CHANNEL NOISE

(71) Applicant: Ixia, Calabasas, CA (US)

(72) Inventors: Prasada Rao Devarasetty, Cary, NC (US); Zhiyong Yan, Cary, NC (US); Roger Alan Slyk, Raleigh, NC (US); Ramanathan Asokan, Cary, NC (US)

(73) Assignee: Ixia, Calabasas, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/069,215

(22) Filed: Oct. 31, 2013

(65) Prior Publication Data

US 2015/0117225 A1 Apr. 30, 2015

(51) Int. Cl.
*H04W 4/00* (2009.01)
*H04W 24/06* (2009.01)

(52) U.S. Cl.
CPC .................................. *H04W 24/06* (2013.01)

(58) Field of Classification Search
CPC combination set(s) only.
See application file for complete search history.

(56) References Cited

U.S. PATENT DOCUMENTS

| 5,465,393 A | 11/1995 | Frostrom et al. |
| 8,050,338 B2 * | 11/2011 | Wilhelmsson ................ 375/260 |
| 2006/0122814 A1 | 6/2006 | Beens et al. |
| 2006/0258320 A1 | 11/2006 | Huang |
| 2009/0163212 A1 | 6/2009 | Hall et al. |
| 2009/0268828 A1 | 10/2009 | Roberts |
| 2010/0075678 A1 | 3/2010 | Akman et al. |
| 2011/0053516 A1 * | 3/2011 | Harteneck .................. 455/67.11 |
| 2011/0142115 A1 * | 6/2011 | Wang et al. .................. 375/227 |
| 2011/0270567 A1 | 11/2011 | Mow et al. |
| 2012/0269278 A1 | 10/2012 | Onggosanusi et al. |
| 2013/0143503 A1 | 6/2013 | Li et al. |

(Continued)

FOREIGN PATENT DOCUMENTS

| JP | 2011-193124 A | 9/2011 |
| KR | 10-2000-0072934 A | 12/2000 |
| KR | 10-2008-0066321 A | 7/2008 |

(Continued)

OTHER PUBLICATIONS

Sur et al, Doppler Shift Impact on the MIMO OFDM System in Vehicular Channel Condition, I.J. Information Technology and Computer Science, 6 pages, 2012.*

(Continued)

*Primary Examiner* — Frank Duong
(74) *Attorney, Agent, or Firm* — Jenkins, Wilson & Taylor & Hunt, P.A.

(57) ABSTRACT

Methods, systems, and computer readable media for testing an air interface device using per user equipment (UE) channel noise are disclosed. One method includes, generating uplink signals at a network equipment test device to be transmitted from plural simulated UEs to an air interface device under test. The method further includes generating and applying per-UE channel noise to the signals, where applying per-UE channel noise includes applying different channel noise to at least some of the uplink signals. The method further includes transmitting the uplink signals with the per-UE channel noise to the air interface device under test.

20 Claims, 5 Drawing Sheets

(56) References Cited

U.S. PATENT DOCUMENTS

2013/0303089 A1 11/2013 Wang et al.
2015/0031310 A1 1/2015 Devarasetty et al.

FOREIGN PATENT DOCUMENTS

| KR | 10-2011-0085274 A | 7/2011 |
| KR | 10-2011-0112502 A | 10/2011 |
| WO | WO 2015/017082 A1 | 2/2015 |

OTHER PUBLICATIONS

Non-Final Office Action for U.S. Appl. No. 14/049,193 (Jun. 30, 2015).

Notification of Transmittal of the International Search Report and the Written Opinion of the International Searching Authority, or the Declaration for International Application No. PCT/US2014/062399 (Jan. 20, 2015).

Notification of Transmittal of the International Search Report and the Written Opinion of the International Searching Authority, or the Declaration for PCT International Application No. PCT/US2014/045647 (Nov. 5, 2014).

Zhong et al., "The MITRE Tactical Channel Emulation System," The MITRE Corporation, Case 13-1750 (May 2013).

Final Office Action for U.S. Appl. No. 14/049,193 (Dec. 10, 2015).

* cited by examiner

METHODS, SYSTEMS, AND COMPUTER READABLE MEDIA FOR TESTING LONG TERM EVOLUTION (LTE) AIR INTERFACE DEVICE USING PER-USER EQUIPMENT (PER-UE) CHANNEL NOISE

TECHNICAL FIELD

The subject matter described herein relates to testing air interface devices. More particularly, the subject matter described herein relates to testing air interface devices using per-UE channel noise.

BACKGROUND

In wireless networks, such as long term evolution (LTE) and LTE advanced networks, it is desirable to evaluate the performance of air interface devices, such as eNode Bs, in the presence of various channel conditions. One channel condition that it is desirable to test is channel noise on the uplink signal. Current test systems utilize a broadband additive white Gaussian noise (AWGN) generator to apply the same noise to all UEs being simulated. Using a broadband AWGN generator is undesirable as it applies the same noise to every UE. Because some UEs are located in different places in real networks, the UEs would actually experience different levels of noise. Wideband AWGN generators are incapable of differentiating between UEs and applying different noise to different UEs. In addition, wideband AWGN generators are expensive.

Accordingly, there exists a need for methods, systems, and computer readable media for testing air interface devices using per-UE channel noise generators

SUMMARY

Methods, systems, and computer readable media for testing an air interface device using per user equipment (UE) channel noise are disclosed. One method includes, generating uplink signals at a network equipment test device to be transmitted from plural simulated UEs to an air interface device under test. The method further includes generating and applying per-UE channel noise to the signals, where applying per-UE channel noise includes applying different channel noise to at least some of the uplink signals. The method further includes transmitting the uplink signals with the per-UE channel noise to the air interface device under test.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
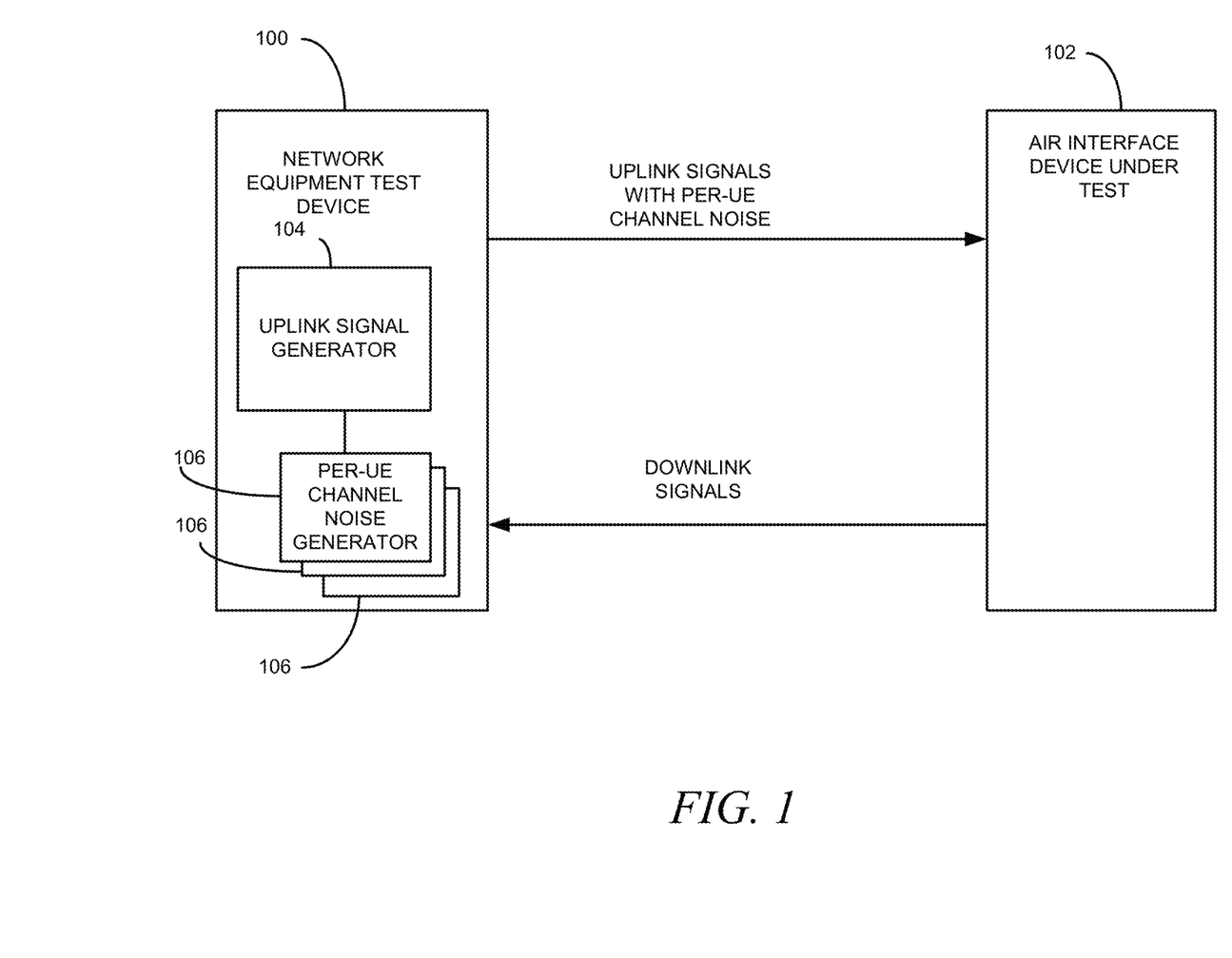
FIG. 1 is a block diagram illustrating an exemplary test environment for using per-UE channel noise to test an air interface device according to an embodiment of the subject matter described herein.

The subject matter described herein includes methods, systems, and computer readable media for applying per-UE channel noise to uplink signals to test an air interface device. FIG. 1 is a block diagram illustrating an exemplary test environment for applying per-UE channel noise to test an air device according to an embodiment of the subject matter described herein. Referring to FIG. 1, a network equipment test device 100 transmits signals to a device under test 102 to test the functionality and performance of the device under test. Device under test 102 may be a stationary air interface device, such as a Node B or an e-Node B.

Network equipment test device 100 may be a multi-UE simulator that simultaneously simulates multiple UEs, such as long term evolution (LTE) or LTE advanced UEs. In the illustrated example, network equipment test device 100 includes an uplink signal generator 104 for generating uplink signals from simulated UEs to be transmitted to device under test 102. Uplink signal generator 104 may generate LTE, LTE advanced, and other uplink signals to test the functionality and performance of device under test 102. Uplink signal generator 104 may generate reference signals, control signals and data signals to simulated uplink transmissions by UEs.

Network equipment test device 100 further includes a plurality of per-UE channel noise generators 106 for generating and applying channel noise to uplink signals on a per-UE basis. In one example, per-UE channel noise generators may generate additive white Gaussian noise (AWGN) on a per-UE basis. Because channel noise is applied on a per-UE basis, different channel noise (such as different levels of channel noise) can be applied to signals from different UEs. As a result, the test environment generated by network equipment test device 100 more accurately simulates a real network environment where real channel noise is different per UE.

Figure 2:
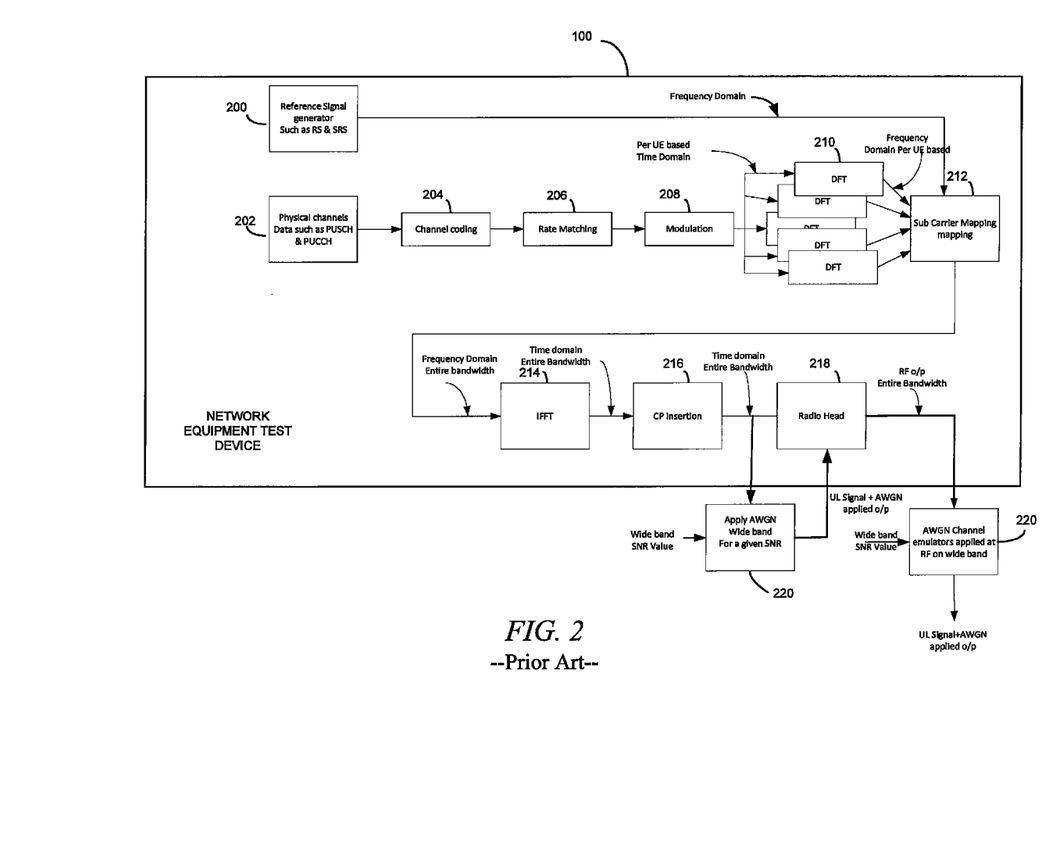
FIG. 2 is a block diagram illustrating a conventional uplink signal chain for applying the same channel noise to all uplink signals.

FIG. 2 is a block diagram of an uplink signal chain architecture implemented by a conventional network equipment test device where the same channel noise is applied to the combined uplink signal from all UEs sharing the entire bandwidth, using a stand-alone white noise generation box. Referring to FIG. 2, the uplink signal chain architecture includes a reference signal generator 200 for generating simulated UE reference signals and a physical channel generator 202 for generating physical uplink channels, such as the LTE physical uplink shared channel (PUSCH) and physical uplink control channel (PUCCH). The physical channels undergo channel coding 204, rate matching 206, modulation 208, and discrete Fourier transform (DFT) processing 210 before the physical channels along with the reference signals undergo subcarrier mapping 212, which maps the physical channels to uplink resource blocks.

After subcarrier mapping, the entire uplink signal is in the frequency domain. However, the signal must be converted to the time domain before being transmitted over the air interface. Accordingly, the signal undergoes inverse fast Fourier transform (IFFT) 214 and cyclic prefix (CP) insertion 216 before the signal is provided to radio head 218 and then either transmitted wirelessly over the air interface to a device under test or over a simulated air interface using cables to the device under test.

In conventional multi-UE simulators, channel noise was applied either after CP insertion 216 or after processing by radio head 218 by a stand-alone AGWN generator 220. Such channel noise was applied to the entire signal such that the channel noise applied to all UEs is the same, regardless of transmit power level of the individual UEs. Applying the channel noise to the entire uplink signal does not accurately simulate real world conditions. In addition, a stand-alone wideband channel noise generator is an expensive piece of equipment, presently costing on the order of hundreds of thousands of dollars.

Figure 3:
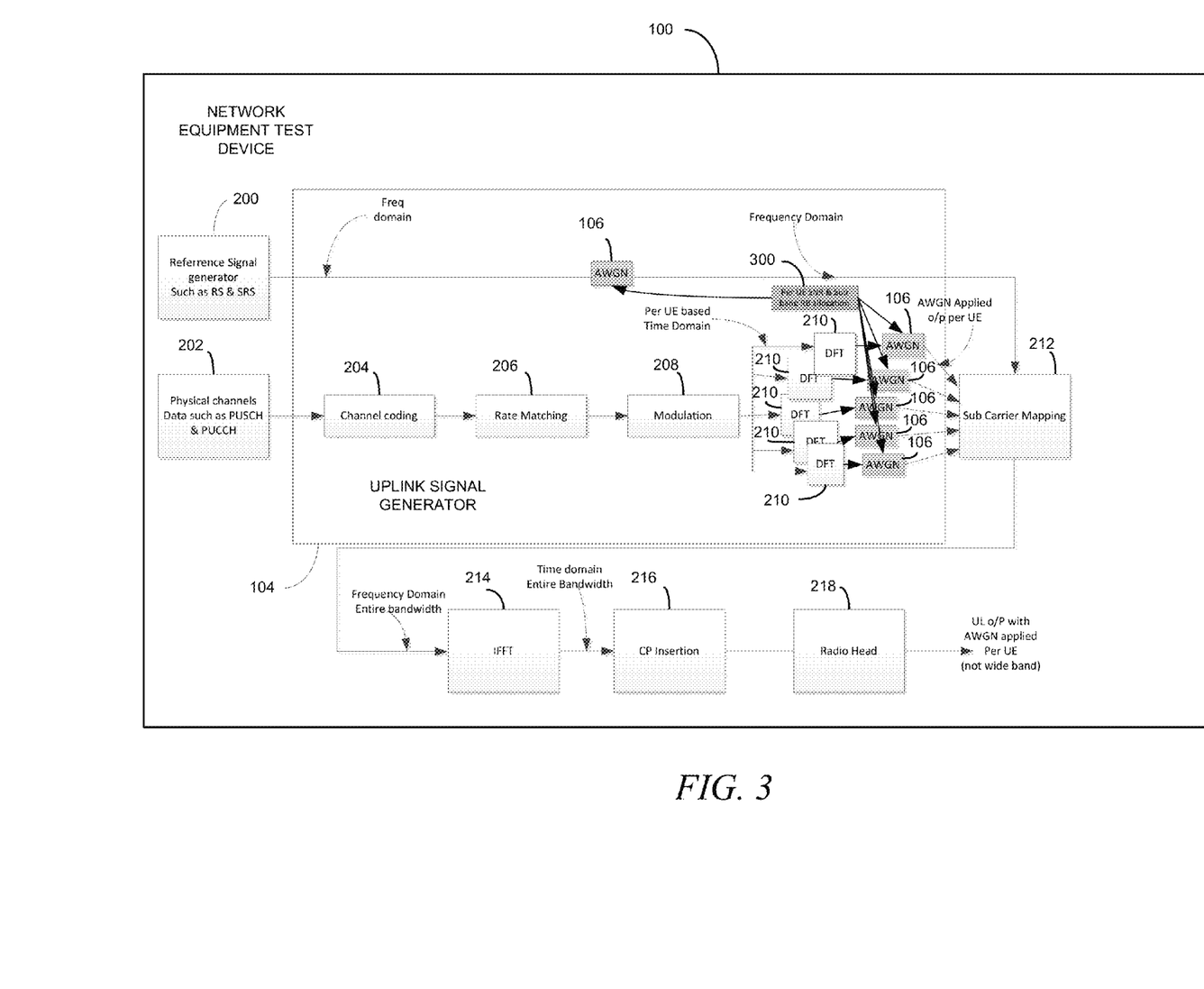
FIG. 3 is a block diagram illustrating an exemplary uplink signal chain architecture for applying per-UE channel noise to uplink signals according to an embodiment of the subject matter described herein.

In order to avoid the shortcomings of wideband, non-UE specific channel noise, the subject matter described herein includes generating and applying per-UE channel noise to uplink signals. FIG. 3 is a block diagram of an exemplary system for per-UE channel noise according to an embodiment of the subject matter described herein. Referring to FIG. 3, the correspondingly numbered blocks in the uplink signal chain perform the same functions as those described with respect to FIG. 2. Accordingly, a description thereof will not be repeated herein. However, rather than applying channel noise on a wideband basis, in the embodiment illustrated in FIG. 3, per-UE channel noise generators 106 generate and apply per-UE channel noise to the uplink signal for each UE. The per-UE channel noise generators 106 generate and apply UE-specific channel noise to the frequency domain uplink signals after discrete Fourier transform processing but prior to subcarrier mapping. Thus, the per-UE channel noise is applied at baseband in the frequency domain to the UE-specific signals. In addition, per-UE channel noise is also applied to the reference signal for each UE.

Because the resources for generating and applying UE-specific channel noise to different UEs may be independent from each other, per-UE channel noise for one UE can be generated and applied to the uplink signal for the one UE simultaneously with the generation and application of different per-UE channel noise to the uplink signal for another UE. For example, the simulated channel noise power level for one UE may be set based on the signal power level and desired SNR for that UE, while the simulated channel noise power level for another UE may be set based on a different signal power level and a different desired SNR for that UE. The desired SNR and signal power levels may be parameters that are input by the test administrator. The generation and addition of the simulated noise signals to the uplink signals for the two UEs may occur simultaneously.

A per-UE SNR and sub-band resource block allocation module 300 may receive the user input for the desired SNR and signal power level and provide or make the parameters available to per-UE channel noise generators 106. Both the signal power level and the desired SNR may be set differently for different UEs. In addition, the signal power level for a particular UE may be fixed for the duration of a test or may vary during a test. In the case where the signal power level varies, per-UE channel noise generators 106 may vary the noise power level to maintain the desired SNR for the UE. Sub-band resource block allocation module 300 may also indicate to each per-UE noise generator 106 in which sub band the resource blocks for a particular UE will occur so that per-UE noise generators 106 will know in which resource block(s) noise should be added for a particular UE.

Figure 4:
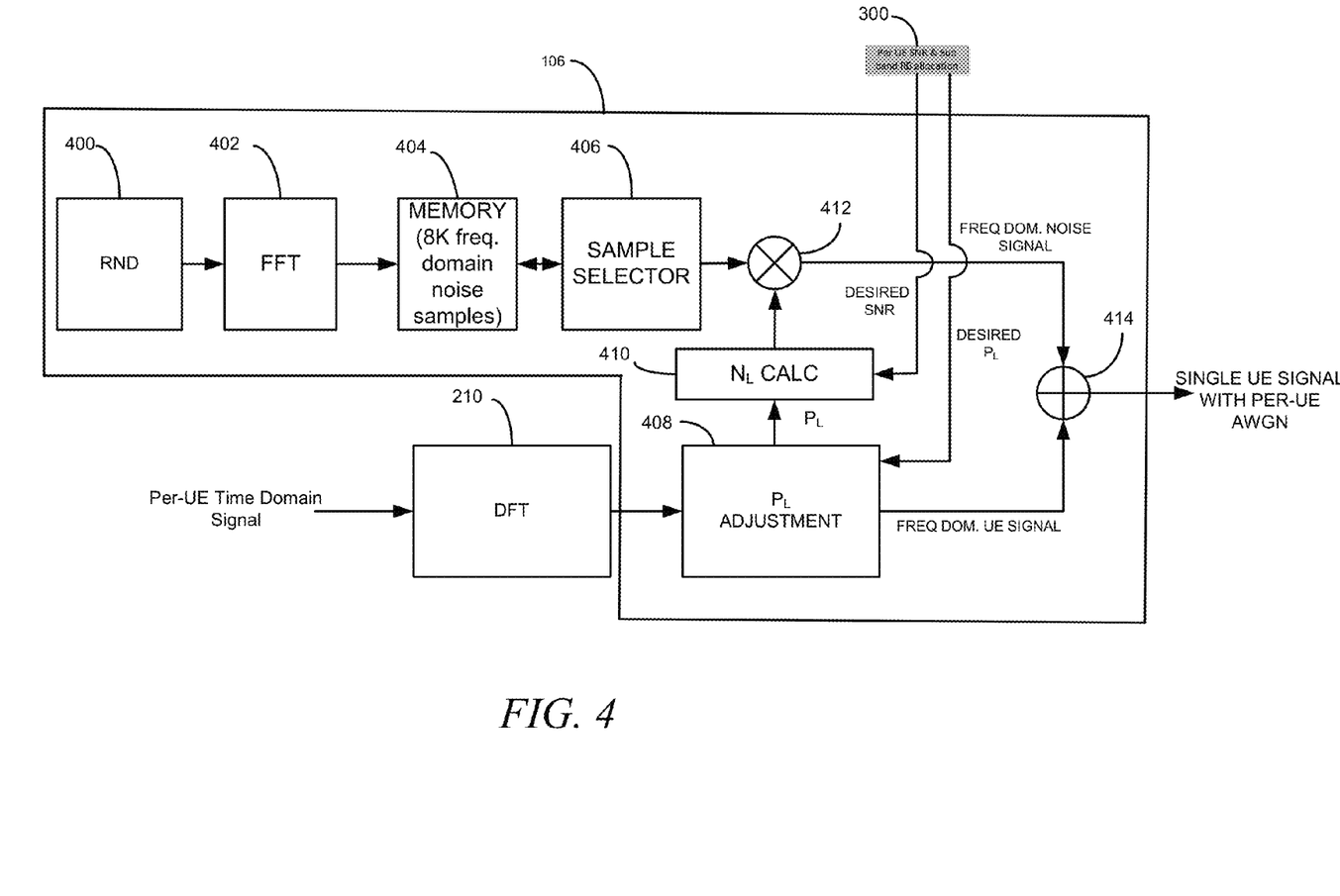
FIG. 4 is a block diagram illustrating a method and an apparatus for per-UE channel noise generation and application according to an embodiment of the subject matter described herein.

FIG. 4 is a block diagram illustrating an exemplary internal architecture of per-UE channel noise generator 106 according to an embodiment of the subject matter described herein. Referring to FIG. 4, per-UE channel noise generator 106 includes a random signal generator 400 that generates a random time domain signal. The power level of the signal may be set for peak noise generation. A fast Fourier transform block 402 converts the random time domain signal to the frequency domain and stores frequency domain noise signal samples in memory 404. In the illustrated example, 8000 frequency domain samples are stored due to limited memory resources but randomized among these stored samples per UE basis and per subframe basis. However, the subject matter described herein is not limited to storing 8000 samples. More or fewer samples may be stored depending on available memory resources and processing power.

A sample selector 406 selects samples from memory 404 at random to be mixed with the uplink signal. Selecting the samples at random reduces the occurrence of patterns in the per-UE noise signal.

A power level adjustment module 408 receives the time domain uplink signal and the desired signal power level and adjusts the time domain signal accordingly. A noise power level calculation block 410 receives as input the desired SNR for a particular UE and either the desired signal power level or the actual signal after adjustment and calculates the noise power level needed to achieve the SNR using the following equation:

$$SNR = \frac{P_L}{N_L} \quad (1)$$

where SNR is the signal to noise ratio, $P_L$ is the desired signal power level, and $N_L$ is the desired noise power level. Solving Equation 1 for $N_L$, the noise power level can be determined by the following equation:

$$N_L = \frac{P_L}{SNR} \quad (2)$$

If the desired signal power level is fixed for the duration of a test, Equation 2 can be calculated once, and the value determined for $N_L$ for the UE can be used for the duration of the test. If the desired signal power level is variable, Equation 2 can be used to continually calculate and update the value for $N_L$ for the UE during the test.

Once the value for $N_L$ is determined, the value may be input to a mixer or multiplier 412, which multiplies the noise signal sample by the calculated noise power level $N_L$. The power adjusted noise sample is added via adder 414 to the power adjusted signal output from adjuster 408. The resulting output signal is an uplink signal with additive per-UE channel noise.

Returning to FIG. 3, after the per-UE channel noise is added to the uplink signals, the signals undergo sub-carrier mapping by subcarrier mapping block 212, inverse FFT processing by inverse FFT block 214, CP insertion, by CP insertion block 216, and transmission over the air to the device under test by radio head 218. It should be noted that radio head 218 functions as an interface for transmitting the test signals to a device under test. In an alternate embodiment, radio head 218 may be omitted from the test, and the signals may be transmitted to the device under test over a wired interface, such as a wired common public radio (CPRI) interface.

Figure 5:
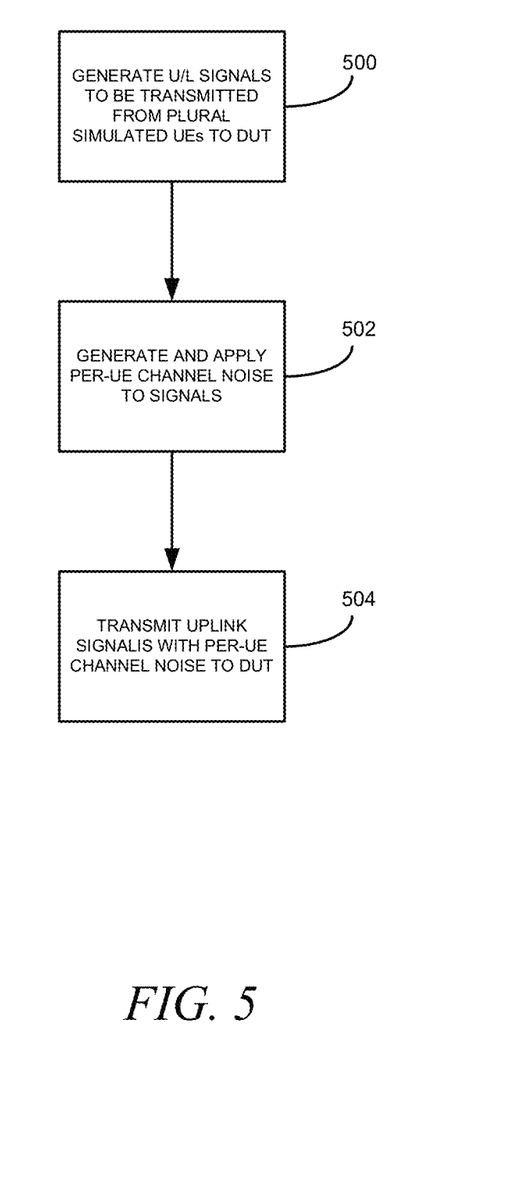
FIG. 5 is a flow chart illustrating an exemplary process for testing an air interface device by generating and applying per-UE channel noise to uplink signals according to an embodiment of the subject matter described herein.

FIG. 5 is a flow chart illustrating exemplary steps for testing an air interface device using per-UE channel noise added to uplink signals according to an embodiment of the subject matter described herein. Referring to FIG. 5, in step 500, uplink signals to be transmitted from plural simulated UEs to an air interface device under test are generated. For example, network equipment test device 100 may generate physical channels and reference signals for multiple UEs. In step 502, per-UE channel noise is generated and applied to the signals so that at least some of the signals have different channel noise. For example, per-UE channel noise generators 106 may generate and apply different channel noise to at least some of the simulated UE uplink signals using the architecture illustrated in FIG. 4. In step 504, the signals are transmitted to the device under test. For example, network equipment test device 100 transmits the uplink signals with the per-UE additive noise to the device under test over a wired or wireless interface, depending on the test configuration.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing an air interface device using per user-equipment (UE) channel noise, the method comprising:
at a network equipment test device:
generating per-UE time domain uplink signals to be transmitted from plural simulated user equipment (UEs) to an air interface device under test;
performing Fourier transformation of the per-UE time domain uplink signals to form per-UE frequency domain uplink signals;
generating and individually applying per-UE channel noise to the per-UE frequency domain uplink signals, wherein applying per-UE channel noise includes applying different channel noise to at least some of the per-UE frequency domain uplink signals;
performing subcarrier mapping of per-UE frequency domain uplink signals to form an entire bandwidth frequency domain uplink signal with per-UE channel noise;
performing inverse Fourier transformation of the entire bandwidth frequency domain uplink signal to form an entire bandwidth time domain uplink signal with per-UE channel noise, and
transmitting the entire bandwidth time domain uplink signal with the per-UE channel noise in an uplink direction to the air interface device under test.

2. The method of claim 1 wherein generating per-UE time domain uplink signals includes generating long term evolution (LTE) or LTE advanced uplink signals.

3. The method of claim 1 wherein generating per-UE time domain uplink signals includes generating uplink reference signals, control channel signals, and data channel signals.

4. The method of claim 3 wherein applying per-UE channel noise to the per-UE frequency domain uplink signals includes applying the per-UE channel noise to the reference signals, the data channel signals, and the control channel signals on a per-UE basis.

5. The method of claim 1 wherein the air interface device under test comprises an evolved Node B (e-Node B).

6. The method of claim 1 wherein the per-UE channel noise comprises additive white Gaussian noise (AWGN).

7. The method of claim 1 wherein applying the per-UE channel noise includes, for a simulated UE, determining a level of channel noise to be applied to the uplink signal for the UE based on transmit signal power of the simulated UE and a desired signal to noise ratio (SNR).

8. The method of claim 7 wherein the transmit signal power for the UE is fixed.

9. The method of claim 7 comprising varying the transmit signal power and wherein applying the per-UE channel noise includes adjusting the level of channel noise to maintain the desired SNR as the transmit signal power varies.

10. A system for testing an air interface device using per user equipment (UE) channel noise, the system comprising:
a network equipment test device, including:
an uplink signal generator for generating per-UE time domain uplink signals to be transmitted from plural simulated user equipment (UEs) to an air interface device under test;
a plurality of Fourier transformation units for performing Fourier transformation of the per-UE time domain uplink signals to form per-UE frequency domain u link signals;
a plurality of per-UE channel noise generators for generating and individually applying per-UE channel noise to the per-UE frequency domain signals, wherein applying per-UE channel noise includes applying different channel noise to at least some of the per-UE frequency domain uplink signals;
a subcarrier mapper for performing subcarrier mapping of per-UE frequency domain uplink signals to form an entire bandwidth frequency domain uplink signal with per-UE channel noise;
an inverse Fourier transformation unit for performing inverse Fourier transformation of the entire bandwidth frequency domain uplink signal to form an entire bandwidth time domain uplink signal with per-UE channel noise; and
a network interface for transmitting the entire bandwidth time domain uplink signal with the per-UE channel noise in an uplink direction to the air interface device under test.

11. The system of claim 10 wherein the air interface device under test comprises an evolved Node B (e-Node B).

12. The system of claim 10 wherein the per-UE channel noise generators are configured to generate per-UE additive white Gaussian noise (AWGN) to be added to the uplink signals for each simulated UE.

13. The system of claim 10 wherein the uplink signal generator is configured to generate long term evolution (LTE) or LTE advanced uplink signals.

14. The system of claim 10 wherein the uplink signal generator is configured to generate uplink reference signals, control channel signals, and data channel signals.

15. The system of claim 14 wherein the per-UE channel noise generators are configured to apply channel noise to the reference signals, the data channel signals, and the control channel signals on a per-UE basis.

16. The system of claim 10 wherein the per-UE channel noise generators are configured to, for a simulated UE, determine a level of channel noise to be applied to the uplink signal for the simulated UE based on transmit signal power of the UE and a desired signal to noise ratio (SNR).

17. The system of claim 16 wherein the transmit signal power for the UE is fixed.

18. The system of claim 16 wherein the per-UE the uplink signal generators are configured to vary the transmit signal power and wherein the per-UE channel noise generators are configured to adjust the level of channel noise to maintain the desired SNR as the transmit signal power varies.

19. A non-transitory computer readable medium having stored thereon executable instructions that when executed by the processor of a computer control the computer to perform steps comprising:
   at a network equipment test device:
      generating per-user equipment (per-UE) time domain uplink signals to be transmitted from plural simulated UEs to an air interface device under test;
      performing Fourier transformation of the per-UE time domain uplink signals to form per-UE frequency domain uplink signals;
      generating and individually applying per-UE channel noise to the per-UE frequency domain signals, wherein applying per-UE channel noise includes applying different channel noise to at least some of the per-UE frequency domain uplink signals;
      performing subcarrier mapping per-UE frequency domain uplink signals to form an entire bandwidth frequency domain uplink signal with per-UE channel noise;
      performing inverse Fourier transformation of the entire bandwidth frequency domain uplink signal to form an entire bandwidth time domain uplink signal with per-UE channel noise; and
      transmitting the entire bandwidth time domain uplink signal with the per-UE channel noise in an uplink direction to the air interface device under test.

20. The non-transitory computer readable medium of claim 19 wherein the device under test comprises an eNode B.

* * * * *